US010427649B2

(12) United States Patent
Hackl et al.

(10) Patent No.: US 10,427,649 B2
(45) Date of Patent: Oct. 1, 2019

(54) SAFETY COUPLING FOR FIN RAY WIPER (71) Applicant: Robert Bosch GmbH, Stuttgart (DE)

(72) Inventors: Viktor Hackl, Sopron (HU); Michael Weiler, Buehl (DE); Peter Deak, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 15/328,486

(22) PCT Filed: Jul. 10, 2015

(86) PCT No.: PCT/EP2015/065784
§ 371 (c)(1),
(2) Date: Jan. 24, 2017

(87) PCT Pub. No.: WO2016/012262
PCT Pub. Date: Jan. 28, 2016

(65) Prior Publication Data
US 2017/0210348 A1    Jul. 27, 2017

(30) Foreign Application Priority Data
Jul. 24, 2014   (DE) .................. 10 2014 214 560

(51) Int. Cl.
*B60S 1/38*     (2006.01)
*B60S 1/34*     (2006.01)
*B60S 1/40*     (2006.01)

(52) U.S. Cl.
CPC ............. *B60S 1/3801* (2013.01); *B60S 1/342* (2013.01); *B60S 1/345* (2013.01); *B60S 1/3425* (2013.01);
(Continued)

(58) Field of Classification Search
CPC ...... B60S 1/3801; B60S 1/342; B60S 1/3436; B60S 1/3134; B60S 1/345; B60S 1/3452;
(Continued)

(56) References Cited

U.S. PATENT DOCUMENTS 2,142,054 A * 12/1938 Horton .................. B60S 1/34
15/250.34
6,026,536 A   2/2000 Miller et al.
(Continued)

FOREIGN PATENT DOCUMENTS

CN    102555998 A   7/2012
DE    2808596    *  9/1978
(Continued)

OTHER PUBLICATIONS

Machine translation of description portion of Japanese publication 2010089574, published Apr. 2010. (Year: 2010).*
(Continued)

Primary Examiner — Gary K. Graham
(74) Attorney, Agent, or Firm — Michael Best & Friedrich LLP (57) ABSTRACT Disclosed is a windscreen wiper device for a vehicle, in particular a motor vehicle, comprising a fastening element fastened to a drive shaft. The windscreen wiper device comprises a wiper blade having an elongated upper part which is designed at least partially flexibly, an elongated lower part which is designed at least partially flexibly, and a plurality of connecting elements for connecting the upper part and the lower part, wherein the connecting elements are spaced apart from each other along a longitudinal extension of the wiper blade, and wherein the connecting elements are configured to enable a movement of the upper part and lower part relative to each other with a movement component along a longitudinal extension of the wiper blade. The
(Continued)

windscreen wiper device further comprises a fastening part on the wiper blade side, wherein the fastening part on the wiper blade side can be connected to the fastening element in a detachable manner, and a coupling device, wherein the fastening part on the wiper blade side and the fastening element can be connected for conjoint rotation via the coupling device until a defined torque value is exceeded.

17 Claims, 9 Drawing Sheets

(52) U.S. Cl.
CPC .......... *B60S 1/3452* (2013.01); *B60S 1/3454* (2013.01); *B60S 1/3459* (2013.01); *B60S 1/3495* (2013.01); *B60S 1/40* (2013.01); *B60S 2001/3812* (2013.01)

(58) Field of Classification Search
CPC .... B60S 1/3454; B60S 1/3463; B60S 1/3475; B60S 1/3477; B60S 1/3425; B60S 1/3459
USPC ................. 15/250.34, 250.351, 250.352
See application file for complete search history.

(56) References Cited

U.S. PATENT DOCUMENTS

| | | | |
|---|---|---|---|
| 7,506,402 B2* | 3/2009 | Laurens | B60S 1/342 |
| | | | 15/250.31 |
| 8,042,219 B2* | 10/2011 | Stahlhut | B60S 1/3452 |
| | | | 15/250.19 |
| 8,510,896 B2* | 8/2013 | Baik | B60S 1/342 |
| | | | 15/250.3 |
| 2016/0159322 A1* | 6/2016 | Weiler | B60S 1/3411 |
| | | | 15/250.32 |

FOREIGN PATENT DOCUMENTS

| | | |
|---|---|---|
| DE | 102013214064 | 5/2014 |
| FR | 2931762 | 12/2009 |
| GB | 433731 | 8/1935 |
| JP | 2010-89574 | * 4/2010 |
| WO | 2015074876 | 5/2015 |

OTHER PUBLICATIONS

International Search Report for Application No. PCT/EP2015/065784 dated Oct. 1, 2015 (English Translation, 3 pages).

* cited by examiner

SAFETY COUPLING FOR FIN RAY WIPER

BACKGROUND OF THE INVENTION

The invention relates to a windscreen wiper device for a vehicle, in particular a motor vehicle.

Windscreen wiper devices typically have a wiper arm or wiper lever wherein a wiper blade is moved over the windscreen of a motor vehicle. The wiper blade is moved between a first turning position and a second turning position. For this purpose the wiper arm is connected to a wiper motor via the drive shaft. The wiper blade easily loses contact with the windscreen particularly on windscreens having severe changes in curvature and in the event of great temperature fluctuations. This can lead to unwiped wiping areas or to the formation of streaks particularly in the case of severely curved windscreens.

Since a wiping process has to be optimized with regard to a number of parameters, such as for example the amount of rain on the windscreen, any snow which may possibly be on the windscreen, the speed of the vehicle and thus the resulting wind pressure on the wiper arm, it may not be easily possible to reliably prevent streaks from forming just by adapting the pressure of the wiper arm on the windscreen. There is therefore a need to substantially improve the windscreen wiper devices.

For this improvement there are a plurality of peripheral conditions which have to be additionally taken into consideration. There is thus a need to ensure or improve the safety during handling and the user friendliness.

SUMMARY OF THE INVENTION

The object of the present invention is to provide a reliable substantially streak-free wiping of a windscreen of a vehicle and/or to provide a reliable windscreen wiper device with simple handling, more particularly simple fitting and dismantling which prevents damage to the windscreen wiper device, even with higher loads.

According to one embodiment a windscreen wiper device for a vehicle is provided with a fastening element fastened on a drive shaft, more particularly for a motor vehicle. The windscreen wiper device comprises a wiper blade with an elongated upper part which is configured flexibly at least in part, an elongated lower part which is configured flexibly at least in part, and several connecting elements for connecting the upper part and the lower part, wherein the connecting elements are spaced out from one another along a longitudinal extension of the wiper blade, and wherein the connecting elements are designed in order to enable a movement of the upper part and the lower part relative to one another with a component of movement along a longitudinal extension of the wiper blade. The windscreen wiper device furthermore contains a fastening part on the wiper blade side wherein the fastening part on the wiper blade side is detachably connectable to the fastening element, and a coupling device wherein the fastening part on the wiper blade side and the fastening element can be connected for conjoint rotation via the coupling device until a defined torque value is exceeded.

According to a further embodiment a method is provided for restricting a torque which acts on a wiper arm of the windscreen wiper device. The method comprises providing a fastening element which can be fastened on a drive shaft of a vehicle; and providing a wiper blade with fastening part which can be connected detachably to the fastening element. The method furthermore comprises assembling together the fastening part of the wiper arm with the fastening element by means of a coupling device, more particularly a coupling device having a coupling element and a guide element, wherein through this assembly a connection between the fastening element and the fastening part of the wiper arm is produced which is secured against rotation up to a defined torque of the wiper blade.

Preferred embodiments and particular aspects of the invention are apparent from the dependent claims, the drawings and the present description.

According to the embodiments of the invention described here, windscreen wiper devices for vehicles can be easily prepared and fitted with a safety overload device in a particularly favorable manner and for a number of different useful fields. The embodiments of the invention furthermore enable a reliable substantially streak-free wiping of a vehicle windscreen.

According to one embodiment a windscreen wiper device for a vehicle is provided with a fastening element fastened on a drive shaft, more particularly for a motor vehicle. The windscreen wiper device comprises a wiper blade with an elongated upper part which is designed at least partially flexibly, an elongated lower part which is designed at least partially flexibly, and several connecting elements for connecting the upper part and the lower part, wherein the connecting elements are spaced out from each other along a longitudinal extension of the wiper blade, and wherein the connecting elements are configured to enable a movement of the upper part and lower part relative to each other with a movement component along a longitudinal extension of the wiper blade. The windscreen wiper device furthermore comprises a fastening part on the wiper blade side, wherein the fastening part on the wiper blade side can be connected to the fastening element in detachable manner, and a coupling device, wherein the fastening part on the wiper blade side, and the fastening element can be connected for conjoint rotation via the coupling device until a defined torque value is exceeded. A fastening concept can hereby be provided for a windscreen wiper device which connects the drive shaft to the wiper arm for conjoint rotation during normal operation and at the same time prevents damage to the wiper arm during excessive loads on the wiper arm.

According to a further preferred embodiment when the defined torque value is exceeded the fastening part on the wiper blade side is detachable from the fastening element, wherein particularly when the defined torque is exceeded the fastening part on the wiper blade side is released from the fastening element. A reliable separation of the relevant components is thereby achieved and damage to the components through high torque loads is prevented.

According to a further preferred embodiment the windscreen wiper device furthermore comprises the fastening element wherein the coupling device comprises in particular a coupling element which is attached to the fastening element and moves when the defined torque value is reached. By providing a movable coupling element on the fastening element the wiper arm and the fastening part of the wiper arm can be designed and produced in a very simple commercially viable manner. In one example the fastening part of the wiper arm can have furthermore, for fastening on the fastening element, a cavity providing contact faces for the fastening element. The wiper arm can thus be fitted in a simple commercially viable manner whilst the function of the movable coupling element remains in the fastening element.

According to a further preferred embodiment, in the event of torque values below the defined torque value the coupling device produces a force-fitting and/or form-fitting connection between the fastening element and the fastening part of the wiper arm. A rotationally secured connection between the fastening element and the fastening part can thereby be produced, and more particularly the rotation of the drive shaft, to which the fastening element can be fastened, can be transferred to the wiper blade.

According to a further preferred embodiment the coupling device comprises a coupling element with a radius and a guide element which bears at least partially against the coupling element in the event of torques below the defined torque, wherein more particularly the coupling element is attached to the fastening element and the guide element is attached to the fastening part of the wiper arm. This represents a simple, reliable way of restricting the torque taking into account the structural conditions and advantageous embodiments of the fastening part and the fastening element.

According to a further preferred embodiment a rotationally secured connection between the fastening element and the fastening part can be produced by the guide element which bears against the coupling element. It is then advantageous that both the stable support of the fastening part of the wiper blade on the fastening element and also the coupling function of the coupling element and the guide element can be provided.

According to a further preferred embodiment the coupling device furthermore comprises a force-producing element, more particularly a spring, which is attached to the coupling element. The coupling element can be held in a stable position by a force-producing element on the coupling element up to a certain force or a certain torque which acts on the force-producing element.

According to a further preferred embodiment the coupling element and the guide element are configured so that the coupling element with radius on reaching the defined torque slips through the guide element and then more particularly releases the rotationally secured connection between the fastening element and fastening part. The slip-through of the coupling element can be produced in particular by the complementary configuration of the coupling element radius and the guide element. Thus for example a correspondingly configured force-producing element can co-define the torque limit at which the coupling element slips through the guide element. This represents a reliable, easily achieved way of implementing the safety concept of the embodiments described here.

According to a further preferred embodiment the coupling device comprises a slip coupling. By using a slip coupling further safety aspects are included, more particularly after exceeding the toque limit value the wiper arm is not released from the fastening element but only the force transmission between the drive shaft and the wiper arm is interrupted.

According to a further preferred embodiment the fastening part on the wiper blade side is formed in one piece wherein the fastening part on the wiper blade side is in particular adapted to be produced by means of injection molding, more particularly an injection molding process in one step. These embodiments enable a simple, commercially viable manufacture of the fastening part of the wiper blade.

According to a further preferred embodiment the fastening part on the wiper blade side has a cavity wherein a guide element of the coupling device is located in this cavity and wherein the fastening part on the wiper blade side furthermore has in particular a contact point. This represents a reliable fastening of the fastening part and the fastening element which is secured against rotation.

According to a further preferred embodiment the fastening part on the wiper blade side can be formed free of metal and/or without movable elements. This can likewise serve for a simple configuration. For example a wiper blade can be made commercially viable as a spare part.

According to a further preferred embodiment the fastening part on the wiper blade side can be designed to enable rotation relative to the fastening element about an axis perpendicular to the longitudinal extension of the wiper blade and perpendicular to the drive axis relative to the fastening element in the event of a torque lower than the defined torque. A defined contact pressure of the wiper lip against the windscreen can hereby be produced. For example according to further embodiments the rotation of the fastening part relative to the fastening element is restricted to an angular region of 30° or less. This is consequently not a rotation which corresponds to the unfolding of the wiper blade away from the windscreen.

According to a further embodiment the plurality of connecting elements can be connected to the upper part at several upper connecting positions and to the lower part at several lower corresponding connecting positions wherein during movement of the upper part and of the lower part relative to one another the distance between an upper connecting position and a corresponding lower connecting position is substantially constant, more particularly is constant with a deviation of ±1 mm. A force-transmission between the upper part and the lower part can hereby be provided which enables a windscreen wiper device which operates according to the fin ray principle.

According to a further embodiment a method is provided for restricting a torque which acts on a wiper arm of a windscreen wiper device. The method comprises providing a fastening element which is fastenable to a drive shaft of a vehicle; and providing a wiper blade with a fastening part which can be connected detachably to the fastening element. The method furthermore comprises fitting together the fastening part of the wiper arm with the fastening element by means of a coupling device, more particularly a coupling device having a coupling element and a guide element wherein by through this assembly a connection is produced between the fastening element and the fastening part of the wiper arm which is secured against rotation up to a defined torque. A safety concept can thus be provided for a windscreen wiper device which prevents damage to the wiper blade in the event of a high torque load. In one example the method can furthermore comprise pressing the coupling element against the guide element by a force-producing element, more particularly a spring. A secure seat is thereby ensured during normal operation, i.e. without the influence of a high torque on the wiper arm.

BRIEF DESCRIPTION OF THE DRAWINGS

Exemplary embodiments of the invention are shown in the figures and will be described in further detail below. In the drawings.

DETAILED DESCRIPTION

In the following, unless mentioned otherwise, the same reference numerals are used for the same and similar-acting elements.

Figure 1:
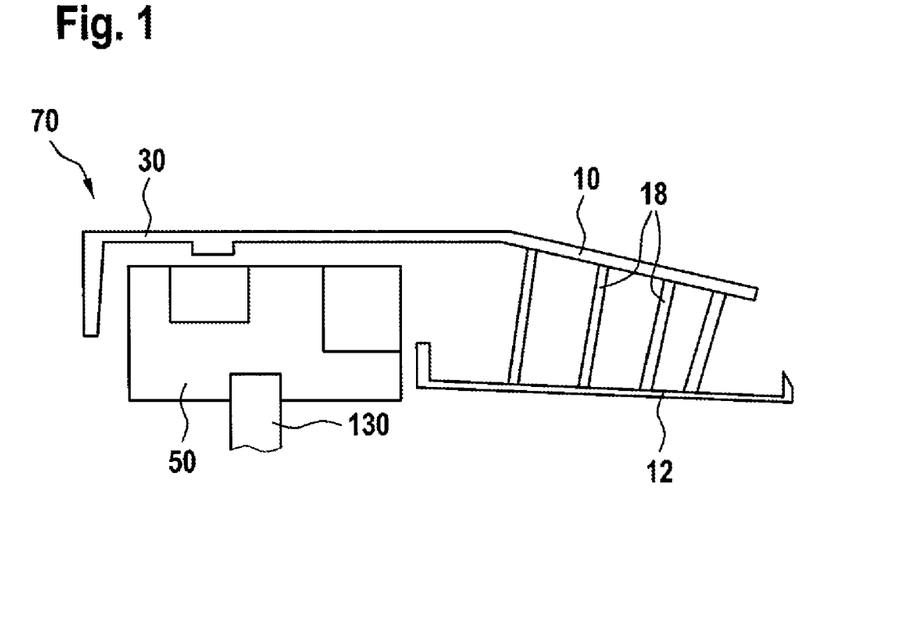
FIG. 1 shows a diagrammatic illustration of a part of a wiper blade in a longitudinal sectional view.

FIG. 1 shows a diagrammatic illustration of a section of a wiper blade 2 which can be part of a windscreen wiper device for a vehicle, more particularly for a motor vehicle, according to embodiments of the invention. FIG. 1 shows the windscreen wiper device in a position here placed against a windscreen 4. The wiper blade 2 comprises an elongated upper part 10 and an elongated lower part 12 which are configured at least partially flexibly. Furthermore several connecting elements 18 are provided for connecting the upper part 10 and the lower part 12 wherein the connecting elements 18 are spaced apart from one another along a longitudinal extension 8 of the wiper blade 2. The connecting elements 18 are designed to allow a movement of the upper part 10 and the lower part 12 relative to one another with a movement component along a longitudinal extension of the wiper blade 2. The connecting elements are here connected to the upper part 10 at a respective upper connecting position and to the lower part 12 at a respective lower connecting position.

For example a swivel joint is provided at each of the connecting positions. During movement of the upper part 10 and the lower part 12 relative to one another the distance from an upper connecting position to a lower connecting position on the same connecting element does not essentially change, i.e. the distance is constant with deviations of for example ±1 mm, more particularly ±0.3 mm.

The wiper blade 2 furthermore has a head end 70. A fastening part 30, i.e. a fastening part 30 on the wiper blade side, is provided at the head end. The distance between the upper part 10 and the lower part 12, starting from the head end, becomes smaller along the longitudinal extension of the wiper blade 2, at least in the regions of the longitudinal extension of the wiper blade or in a major part of the longitudinal extension of the wiper blade. Starting from the head end the height of the wiper blade tapers wedge-shaped in regions, or becomes smaller in regions of the longitudinal extension. For example, according to embodiments for a plurality of connecting elements the length of the connecting elements can be provided such that the connecting elements provided at the head end are longer than those on the opposite side of the wiper blade along the longitudinal extension.

Through these properties a windscreen wiper device can be provided which functions according to the fin ray principle. These windscreen wiper devices typically have no articulated joint to lift the wiper blade or a wiper lip from a windscreen, for example a windscreen of a motor vehicle. For example the wiper blade 2 is released by means of a quickfix fastener from a fastening element 50 provided on a drive shaft 130.

FIG. 1 shows a fastening part 30 on the wiper blade side and a fastening element 50. In order to attach the wiper blade 2 or release the wiper blade a translatory movement takes place which can be oriented for example substantially along the axis of the drive shaft 130. Where necessary this movement can include an angle with the drive shaft of ±15° or less. A torsion or rotation of the fastening part 30 about an axis parallel to the longitudinal extension of the wiper blade can be restricted or excluded by guide elements in the fastening part 30 or a fastening element 50.

Figure 2:
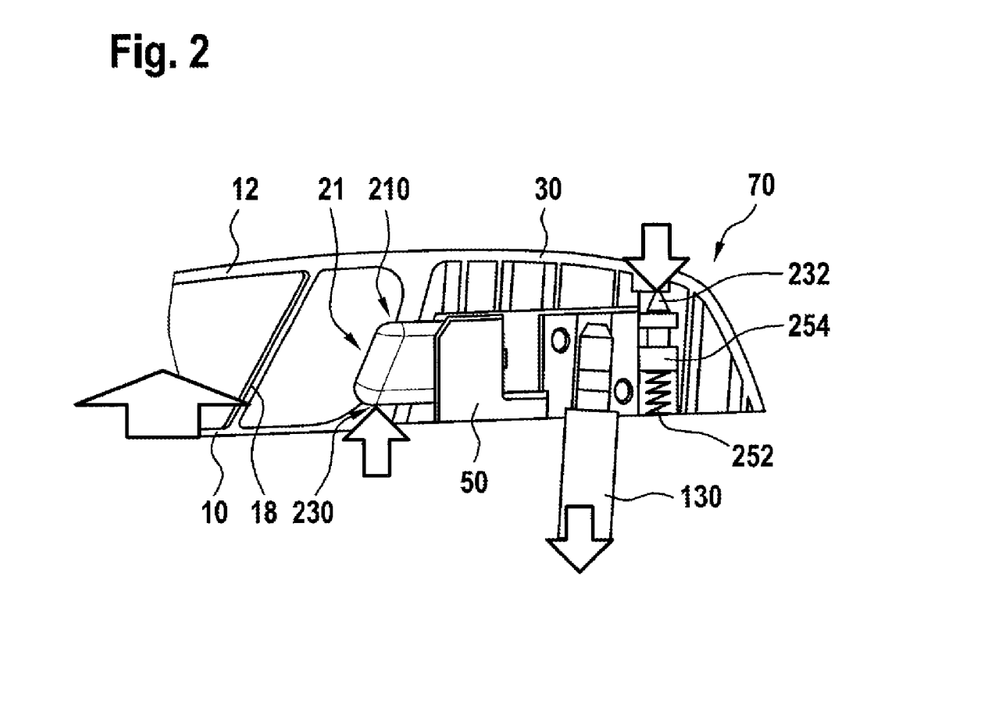
FIG. 2 shows a diagrammatic illustration of a part of a wiper blade in a longitudinal sectional view according to the embodiment of the invention wherein a fastening part on the wiper blade side is fastened on a fastening element.

FIG. 2 shows a section of a wiper blade 2 of a windscreen wiper device according to embodiments of the invention where a fastening part 30 is formed at the head end 70 of the wiper blade 2, that is a fastening part on the side of the wiper blade which can be connected detachably to a fastening element 50. The fastening element 50 is provided on a drive shaft 130. The fastening element 50 is for example clamped on the drive shaft so that rotation of the drive shaft 130 is transferred to the fastening element 50. This rotation is in turn transferred to the fastening part 30 so that the wiper blade 2 rotates on a windscreen of a vehicle, for example a motor vehicle.

The wiper blade 2 comprises an upper part 12, a lower part 10 and several connecting elements 18. The fastening part 30 comprises a cavity and an opening 210. The cavity is oriented to receive the fastening element 50. The opening 210 is adapted so that a coupling element 21 of a coupling device can be inserted into the opening. The opening 210 can also be termed a guide element of a coupling device. In one embodiment the opening 210 offers a support bearing 230 wherein the lower region is the region of the opening 210 which faces a windscreen.

The embodiment of a windscreen wiper device according to the invention illustrated by way of example in FIG. 2 comprises a coupling device which can connect the fastening element and the fastening part of the wiper arm to one another for conjoint rotation up to a predefined torque so that when the windscreen wiper is actuated in the vehicle the rotation of the drive shaft 130 can be transferred to the wiper arm. On the other hand the coupling device according to the embodiments of the invention allows a (functional or structural) separation of the fastening element and the fastening part when the defined torque is exceeded. In one example of the embodiment according to the invention which is also shown in the drawings, the connection between the fastening element and the fastening part is released so that the wiper arm is released from the fastening element. In another example a coupling device is provided in the windscreen wiper device which when the defined torque is exceeded interrupts the connection which is transferring the rotation of the drive shaft, whilst the fastening element and the fastening part remain fastened against one another. A coupling of this kind can also comprise slip coupling for example.

The use of a windscreen wiper device according to the invention according to embodiments described here then prevents damage to a windscreen wiper arm e.g. through a build-up of snow, vandalism or the like.

According to embodiments of the present invention a rotational position is determined about an axis perpendicular to the longitudinal extension of the wiper blade and perpendicular to the axis of the drive shaft (or perpendicular to the linear assembly direction) through a first contact point and a second contact point between the fastening part 30 on the wiper blade side and in the fastening element 50. The position of the wiper blade 2 is thus defined without being overdefined.

In one embodiment of the present invention the first contact point is provided through a guide element of the coupling device which is provided between the axis of rotation of the drive shaft 130 and a connecting element 18, and the second contact point is provided through a stop which is provided for example on the opposite side of the drive shaft 130.

According to embodiments of the present invention the stop 232 which is provided on the fastening element 50, can be provided on a movable element 254 in order to define the rotational position with a corresponding position of the fastening part 30. The movable element 254 can be for example a pin movable in a guide. The movement of the movable element 254 can be defined by a spring 252 which applies a force for the stop 232. If for example a force which acts on the lower part 10 during wiping of the wiper blade 2 is increased then the stop 232 is moved downwards via the lever, that is the spring 252 is loaded with a stronger force. The movable element 254 then moves downwards. The stop 232 thus has a variable position wherein a lever exists around the support bearing 230.

According to several embodiments which can be combined with other embodiments, a force of 2 Newton to 10 Newton, for example approximately 5 Newton acting on the underneath side of the wiper blade or acting on the lip fastened to the underneath side, can correspond via a lever ratio to a spring force of 8 Newton to 40 Newton, approximately 20 Newton.

According to yet more embodiments which can be combined with other embodiments, a fastening element 50 can also be configured without a spring. A first rotational position is then provided by the stop 232. The movable element 254 becomes a fixed element. According to yet more embodiments the position of the stop can be provided by different lengths of this fixed element or by different adapters or fitments on the fixed element. The use of a windscreen wiper device can be adjusted to a specific type of vehicle for example by this predefined variation of the stop or contact point.

As described above, through the guide element, which can provide a support bearing for example during normal operation, and through a stop, that is a first contact point and a second contact point, a rotational position can be provided about an axis perpendicular to the longitudinal extension of the wiper blade and perpendicular to the axis of the drive shaft in dependence on a force on the wiper blade. The wiper blade can in dependence on the force rotate in the normal operation about an axis perpendicular to the longitudinal extension of the wiper blade and perpendicular to the axis of the drive shaft. According to one embodiment of the invention the coupling element 21, as shown in FIG. 2, provides a radius in a radius section, whilst in the remaining part it runs substantially straight. The guide element 210, during normal operation, i.e. when the defined torque has not yet been reached, can then partially surround the radius section and can find a contact point in the remaining part which runs essentially straight. More typically the radius section of the coupling element in the fitted state is located on an end of the wiper arm facing the connecting elements 18. In one embodiment the radius is thus arranged so that the curvature of the radius extends in a direction around the drive axis. The radius can indeed, as shown in the FIG. 3 for example, point in the direction of the connecting elements of the wiper arm in the fitted state. Within the scope of this description the term "normal operation" is to mean a load on the wiper arm where the defined torque value has not been exceeded.

Figure 3:
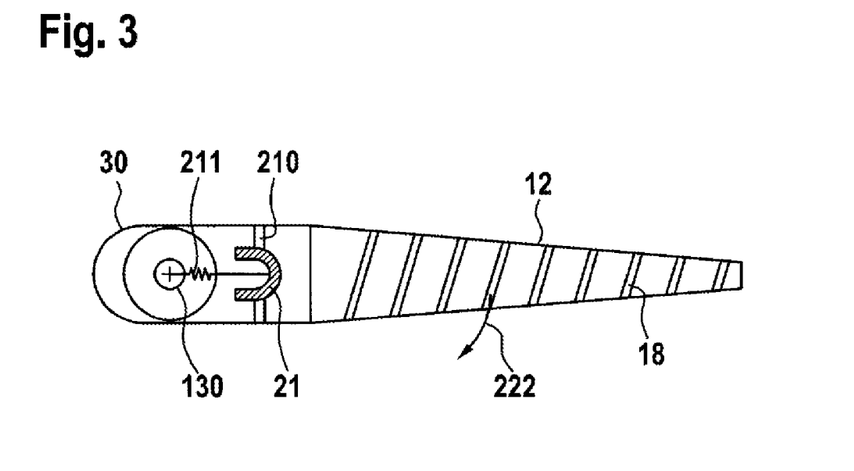
FIG. 3 shows a diagrammatic cross-sectional view from above of a windscreen wiper device with a coupling device according to an embodiment of the invention.

FIG. 3 shows an embodiment of the windscreen wiper device according to the invention with a coupling device. FIG. 3 shows a sectional view along a sectional plane which runs substantially parallel to the upper side of the wiper blade. The windscreen wiper device comprises a coupling element 210 with a radius at a radius section and a guide element 210. In the illustrated example the coupling element 21 is fastened to a force-producing element, more particularly to a spring 211. The guide element 210 can hold the coupling element 21 in a defined position, more particularly in a defined rotational position, during normal operation. When according to arrow 222 in FIG. 3 a torque acts on the wiper arm of the windscreen wiper device and this torque exceeds the defined torque value, then the coupling element 21, more particularly through the configuration of the radius and the corresponding load through the guide element, can slip through the guide element. The guide element can thereby no longer provided a supporting function and the connection between the fastening element and the fastening part of the wiper arm is released. The spring 211 can then co-determine the adjustment of the defined torque value and in the event of torque occurring along the arrow 222 permit a deflection of the coupling element 21.

According to one embodiment the defined torque value can lie in a range from approximately 4 Nm to approximately 50 Nm, more particularly in a range from approximately 10 Nm to approximately 25 Nm.

Figure 4A:
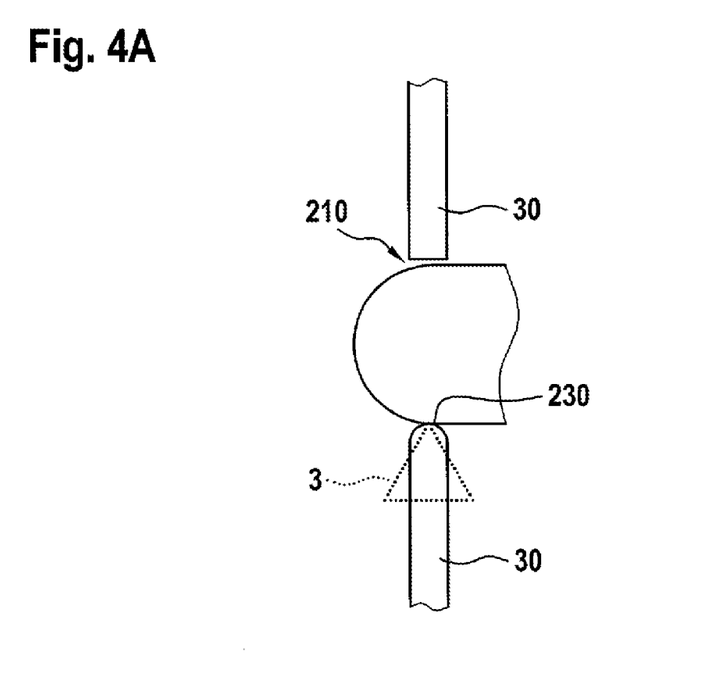
FIG. 4A shows a diagrammatic illustration of an engagement of a part of a coupling element with a guide element of a fastening part on the wiper blade side according to an embodiment of the invention.
Figure 4B:
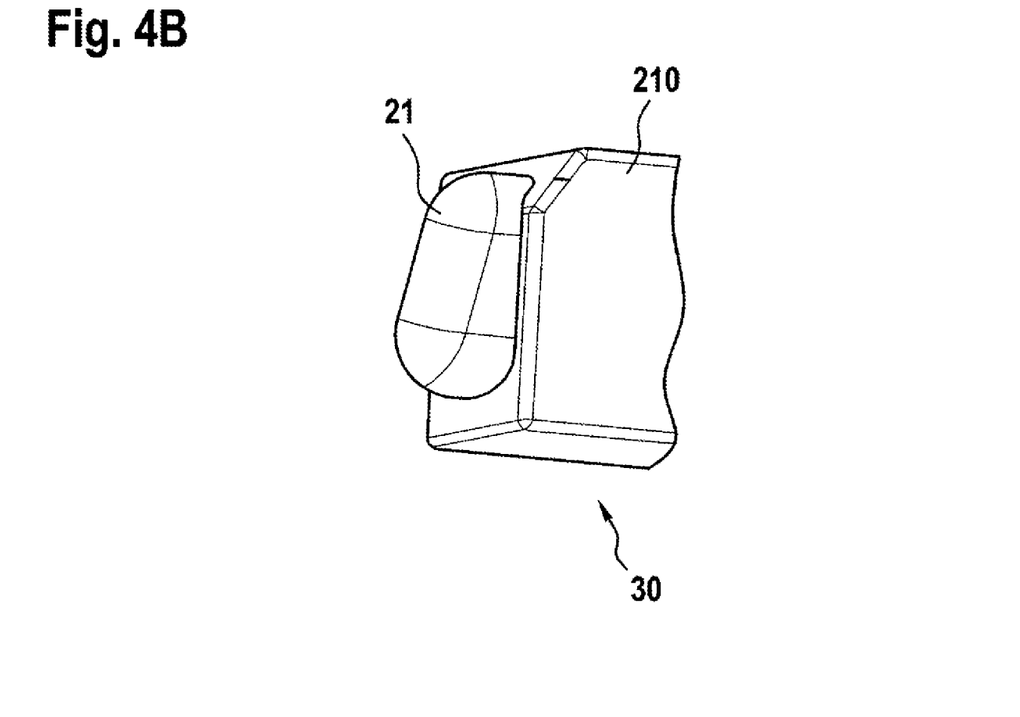
FIG. 4B shows a diagrammatic illustration of a section of a coupling element and guide element according to an embodiment of the invention.

FIGS. 4A and 4B show further details of the guide element 210 which can form a support bearing 230 for the coupling element 21 during normal operation. The support bearing is shown by way of example by a triangle 3. For this a part of the fastening part 30 is shown in section. Furthermore in the embodiment illustrated by way of example the coupling element 21 represents a part of the fastening element 50 which forms an engagement with the fastening part 30. The fastening part 30 has a guide element configured as an opening 210. The coupling element 21 can be inserted into the opening 210 in order to form a force-fitting or form-fitting connection during normal operation. It can be seen in FIG. 4A that the coupling element 21 has a radius and that the guide element 210 surrounds the coupling element only partially at the radius section of the coupling element, whilst the support bearing engages at least partially in a substantially rectilinear section of the coupling element. In the event of torque on the wiper arm a force acts from the guide element 210 on the coupling element of the coupling device. When the torque exceeds the defined torque value, the coupling element slips through the guide element, more particularly owing to the force-producing element 211 on the coupling element 21 and the corresponding positioning of the guide element, furthermore in particular through the configuration of the radius of the coupling element. In one example the wall thickness of the fastening part 30 can amount to 0.5 to 3 mm, more particularly 1 to 2 mm.

Figure 4C:
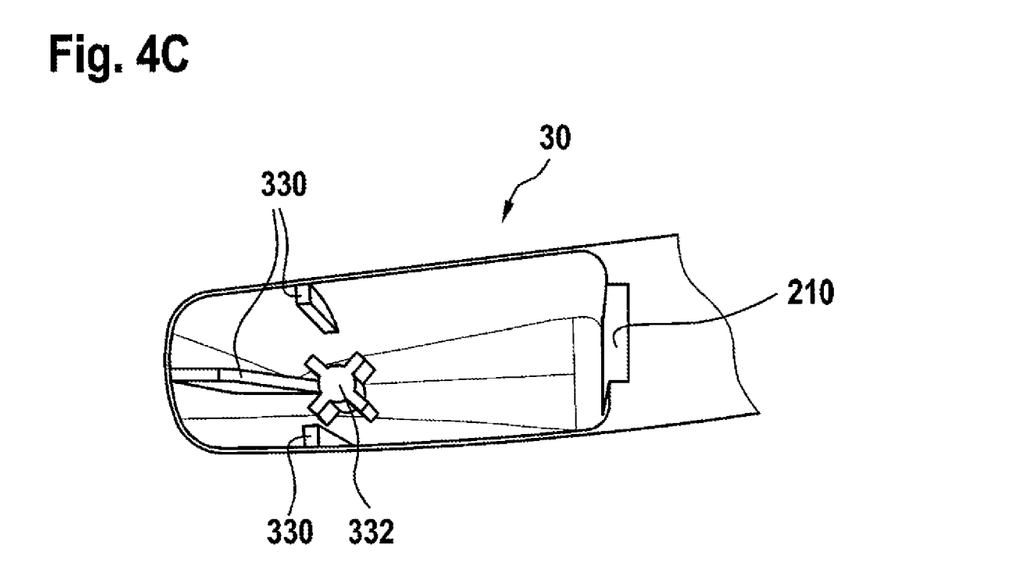
FIG. 4C shows a diagrammatic illustration of the fastening part on the wiper blade side according to an embodiment of the invention.

FIG. 4C illustrates further features, details and aspects of the fastening part 30 according to the embodiment of the invention, which can be provided optionally. The fastening part 30 as described above contains an opening 210 which is shown in part in cross-section in FIG. 4C. Furthermore the fastening part 30 contains a cavity. One or more guide means 330 for the fastening element can be provided in the cavity in order to ensure a secure fastening during normal operation.

According to several embodiments the fastening part 30 or the wiper blade 20 can be provided whereby mechanical elements such as springs, spring elements, actuating devices and/or metallic elements are not provided in the fastening part 30 but in a corresponding fastening element 50. The fastening part 30 is thus adapted to be produced in an injection molding process, more particularly a simple injection molding process or an injection molding process with one step. For example the fastening element 30 consists only of one material. The fastening element 30 has an opening 210 and a cavity. Optionally, moldings such as guide rails or a contact position can be provided in the one material.

FIGS. 5A to 5D show the release and removal of a wiper blade 2 by means of the coupling device according to embodiments of the invention. In the illustrated example the wiper blade 2 has a fastening part 30 at the head end 70. The fastening part contains a cavity and an opening 210. A fastening element 50 is provided on the drive shaft 130. The fastening element 50 contains the coupling element 21 for example.

Figure 5A:
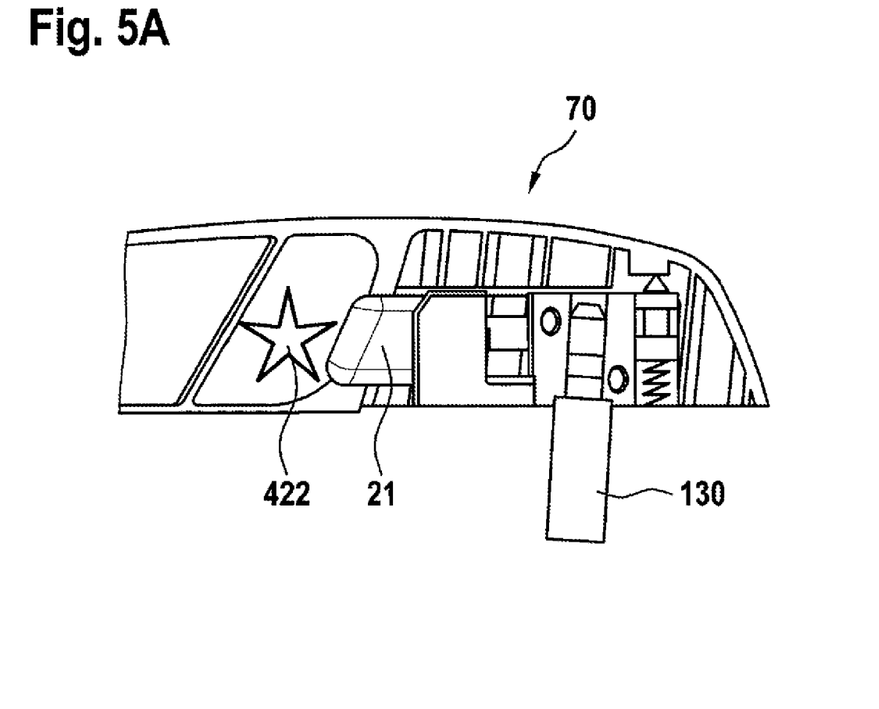
FIGS. 5A to 5D show diagrammatic illustrations of the functioning method of a coupling device of a windscreen wiper device according to an embodiment of the invention.

During normal operation (as shown in FIG. 4A) the coupling element 21 is located in the guide element 210 of the fastening element 50, as shown in FIG. 5A. The rotationally secured connection between the fastening element 50 and the fastening part 30 through the coupling element and the guide element is diagrammatically illustrated in FIG. 5A by the asterisk 422. The stop between the start of the fastening element 50 and the contact position in the fastening part 30 forms a second contact point.

Figure 5B:
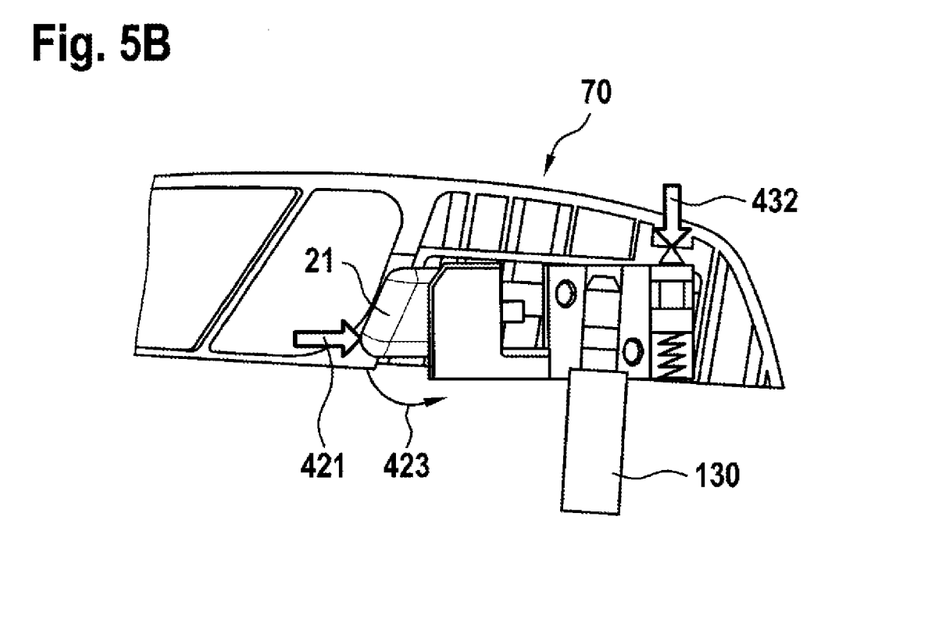

FIG. 5B shows a rotation of the guide element 210 in the direction 423 which can be produced by torque on the wiper arm. If the torque exceeds the defined torque value the guide element exerts such force on the coupling element that the rotation causes a compression of a force-producing element, more particularly a spring on the coupling element 21, as shown by way of example in FIG. 3. The compression of the force-producing element is shown in the direction of the arrow 421 in FIG. 4B. The coupling element 21 slips out from the guide element 210 through the movement of the coupling element 21 in the direction 421 which is caused by compression in the direction 421. The resulting instability of the position of the fastening part 30 in relation to the fastening element 50 can also lead to a release of the contact at the stop, more particularly to a release of the fastening part 30 from the stop, as indicated by arrow 432.

Figure 5C:
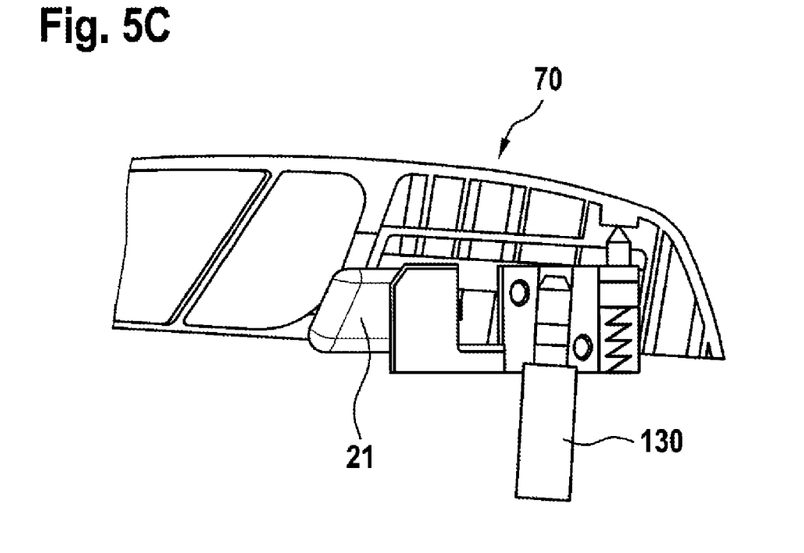
Figure 5D:
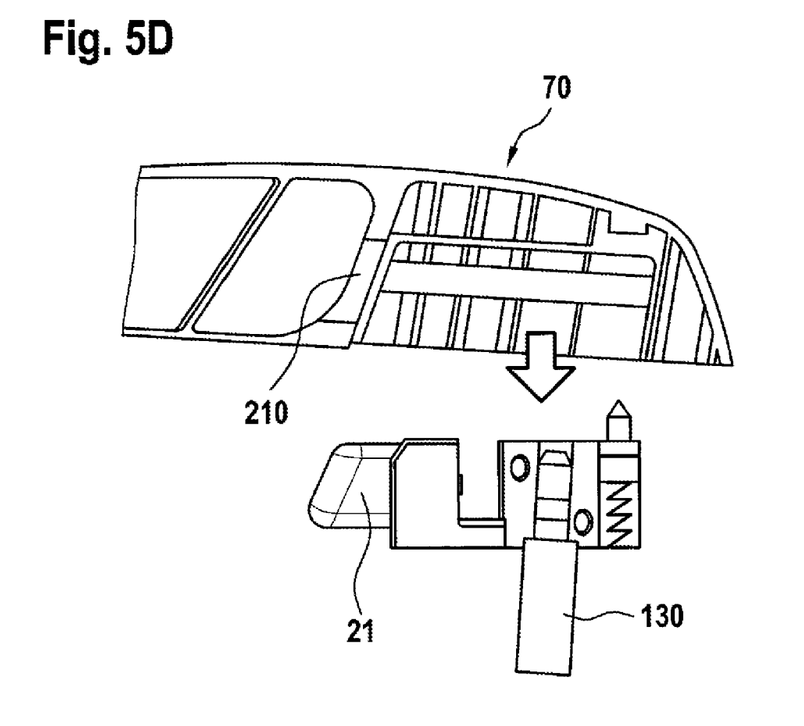

FIG. 5C shows the continuing release of the wiper arm with the fastening part 30 from the fastening element 50 wherein the functional connection between the drive shaft and wiper is also released. FIG. 5D shows the wiper arm with fastening part 30 and the fastening element completely released from one another.

Figure 6:
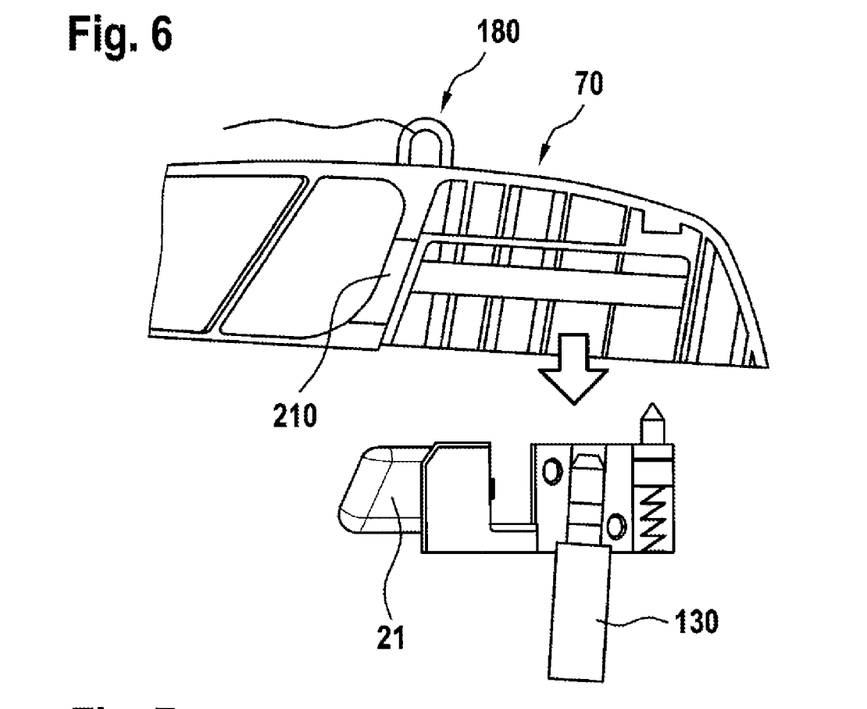
FIG. 6 shows a diagrammatic illustration of a fastening part and a fastening element of a windscreen wiper device according to an embodiment of the invention.

FIG. 6 shows an embodiment of a windscreen wiper device in a form in which the wiper arm with the fastening part 30 at the head end 70 is released from the fastening element 50 through exceeding the defined torque value. In the illustrated example the wiper arm, more particularly at the head end, comprises a retaining element 180 which holds the wiper arm on the vehicle for example in order to prevent (uncontrolled) loss of the wiper arm.

Figure 7:
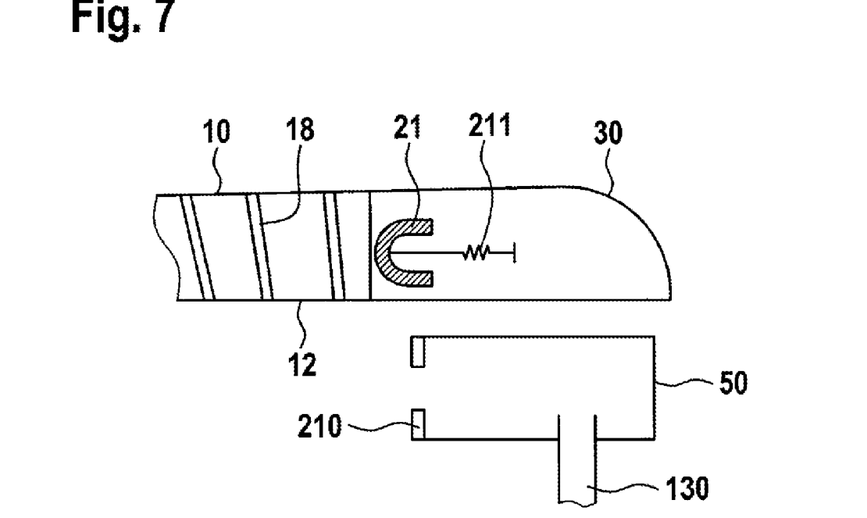
FIG. 7 shows a diagrammatic illustration of a fastening part and a fastening element of a windscreen wiper device according to an embodiment of the invention.

FIG. 7 shows a further embodiment of the windscreen wiper device according to the invention. In the embodiment illustrated in FIG. 7 the coupling element 21 is located in the wiper arm, more particularly in the fastening part 30 of the wiper arm, in order to provide a safety coupling of a windscreen wiper device. According to embodiments of the invention the fastening element 50 can comprise the guide element 210 of the coupling device.

In the following, aspects of an exemplary windscreen wiper device are described for which the embodiments of the windscreen wiper device described herein are advantageous, more particularly with the described safety coupling as a coupling device. The wiper arm or the wiper blade can then be protected particularly reliably against damage when an unusually high torque (i.e. lying outside of the normal operation) acts on the wiper arm. The wiper arm can moreover simply be provided wherein for example the wiper or the windscreen wiper device which is mounted on a vehicle consists solely of plastics. For example the windscreen wiper device can be provided without any metal parts and/or without any mechanical elements.

Figure 8A:
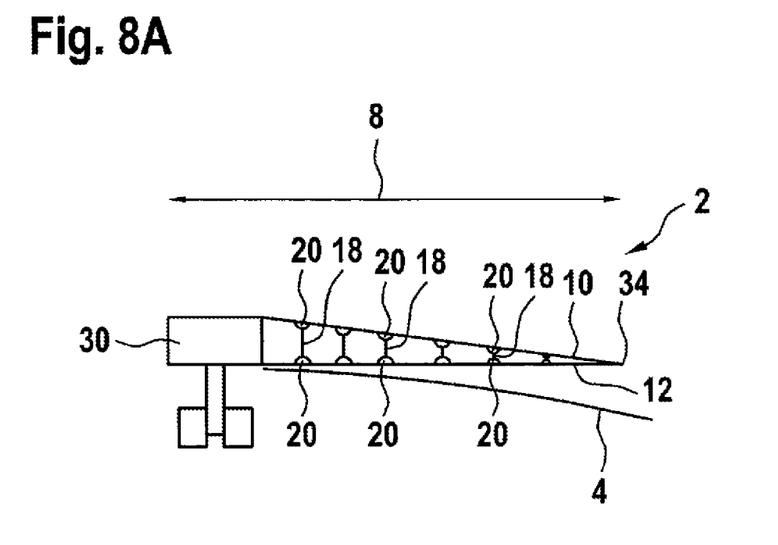
FIG. 8A shows a diagrammatic illustration of a further embodiment of a windscreen wiper device according to the invention in the form of a wiper arm with integrated wiper blade in a basic position.
Figure 8B:
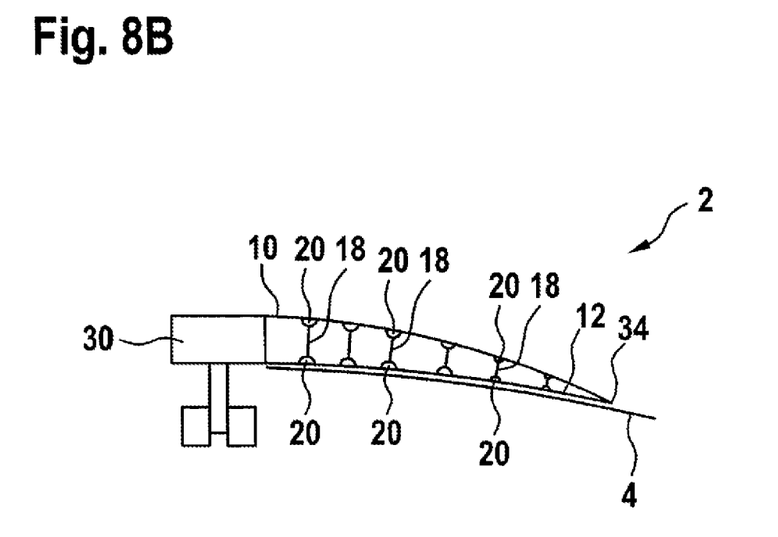
FIG. 8B shows a diagrammatic illustration of a wiper arm with an integrated wiper blade according to FIG. 8A in a position placed against a windscreen.

FIGS. 8A and 8B provide diagrammatic illustrations of a wiper blade 2 in a basic position and in a position placed against a windscreen according to embodiments of the windscreen wiper device of the disclosure. The wiper blade 2 serves to wipe a windscreen 4 of a vehicle which is for example a motor vehicle, more particularly a car. The wiper blade 2 has a longitudinal extension 8 and an elongated upper part 10 and a likewise elongated lower part 12. The longitudinal extensions of the upper part 10 and lower part 12 correspond essentially to the longitudinal extension 8 of the wiper blade 2.

Both the upper part 10 and the lower part 12 are flexible bars or can be configured as flexible bars. It is likewise possible to configure only one part of the upper part 10 and/or of the lower part 12 to be flexible. According to several embodiments which can be combined with the other embodiments described here, one material is used for the upper part 10 and/or the lower part 12, having a modulus of elasticity which lies in a range between 0.005 kN/mm$^2$, and 0.5 kN/mm$^2$, more particularly 0.01 kN/mm$^2$ and 0.1 kN/mm$^2$. This enables the upper part 10 and the lower part 12 to be suitably flexible. An optimum bending resistance is thus produced together with a suitably configured cross-sectional surface of the upper part 10 and the lower part 12.

The upper part 10 and the lower part 12 are fastened on a fastening part 30. The windscreen wiper device can be connected to the vehicle by means of the fastening part 30 for example by a quickfix fastening. On the side which lies opposite the fastening part 30 along the longitudinal extension of the windscreen wiper device, the upper part 10 and the lower part 12 are connected at a connecting position 34. The connecting elements are configured such that the distance of the connecting position with the upper part and the distance of the connecting position with the lower part change by a maximum of ±1 mm, more particularly by a maximum of ±0.3 mm (for example through heat expansion and/or traction and pressure). The connecting elements can thus essentially not be formed as elastic and/or the effect of the connecting elements is based on their force transmission between the upper part and lower part and not on their elasticity.

The upper part 10 and the lower part 12 are connected to one another by connecting elements 18. The connecting elements 18 are fastened on mutually facing inner longitudinal sides of the upper part 10 and the lower part 12 by means of swivel joints 20. More typically the swivel joints 20 are hinges. More particularly the swivel joints 20 can be configured as film hinges. This is particularly advantageous when the upper part 10, the lower part 12 and/or the connecting elements 18 are made from a plastics material or are covered with a suitable plastics material.

According to typical embodiments described here which can be combined with other embodiments described here, a swivel joint is selected from the following group which consists of: a hinge, a film hinge, a tapering of the material to produce lower stiffness along a torsional axis, an articulated joint with an axis of rotation, a means for connecting the upper part with the connecting element or for connecting the lower part with the connecting element which permits the displacement of the lower part in relation to the upper part along the longitudinal extension, etc.

Embodiments in which the articulated joints are provided by film hinges thus provide a very simple way of providing the joints for a fin ray wiper. The wiper blade 2 can be provided in one piece, more particularly off-tool. According to typical embodiments the film hinges have a high extensibility. This can be achieved for example by selecting a material from the group PP, PE, POM, and PA. Alternatively the film hinges can be made from one or more materials from a group from TPE (thermoplastics elastomer), by way of example TPE-S, TPE-O, TPE-U, TPE-A, TPE-V and TPE-E.

The connecting elements 18 are spaced apart from one another along the longitudinal extension of the wiper blade 2. The distances are more advantageously less than 50 mm, more particularly less than 30 mm. A particularly high flexibility can thereby be ensured for the windscreen wiper device, in particular the lower part thereof, and it can readily adapt to the curvature and changes in curvature of the windscreen which is to be wiped.

FIG. 8B shows a diagrammatic illustration of the wiper blade 2 according to FIG. 8A in a position placed against the windscreen 4. Since the windscreen 4 has a curvature, when the wiper blade 2 is placed against the windscreen 4 contact pressure forces act on the lower part 12. Since the upper part 10 and the lower part 12 are flexible bars and the connecting elements 12 are mounted rotatably on the upper part 10 and the lower part 12, the upper part 10 and the lower part 12 are displaceable relative to one another. Through the compression forces acting from below on the lower part 12 the wiper blade 2 bends in that direction from which the compression forces are coming, and fits exactly against the curvature of the windscreen 4.

As a result of the construction of the embodiments described here, when a force is acting on the lower part (through the windscreen 4), the lower part bends in the direction from which the force is acting. This is produced by the connection of the upper part 10 and the lower part at the connecting position 34, the form, and by the swivel joints at the connection between the connecting elements and the upper and lower parts. A windscreen wiper device according to embodiments described here utilizes the effect of tail fins of certain fish which in the event of lateral pressure do not escape in the pressure direction, but arch in the opposite direction, i.e. in the direction from which the pressure is coming. This principle is also termed the "fin ray" principle. A windscreen wiper device according to the embodiments described here thereby has the advantage of an improved adaption to a windscreen of a motor vehicle. With a conventional windscreen wiper blade its upper part is more usually rigid, i.e. it is not formed as flexible.

Figure 9:
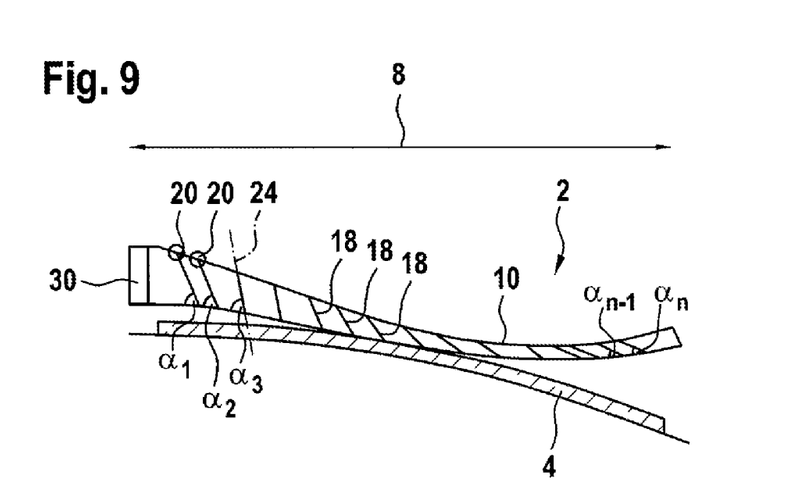
FIG. 9 shows a diagrammatic illustration of a wiper blade according to embodiments of the present invention in a basic position.
Figure 10:
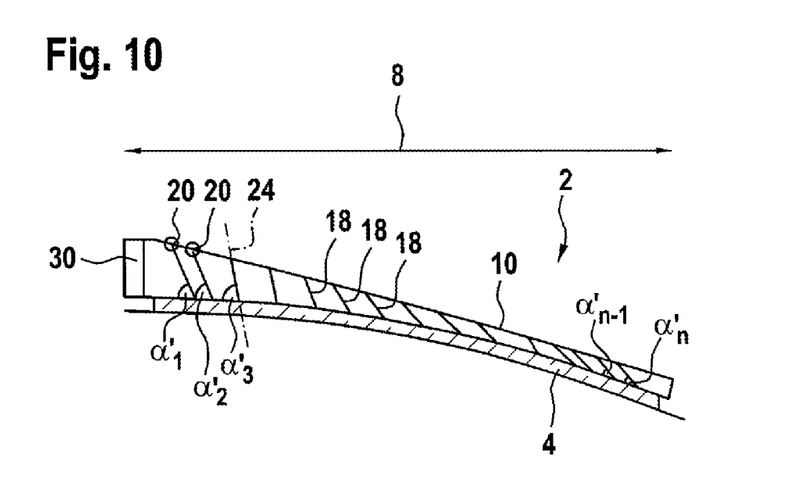
FIG. 10 shows a diagrammatic illustration of a wiper blade according to embodiments of the present invention in a position placed against a windscreen.

FIGS. 9 and 10 show diagrammatic illustrations of a wiper blade 2 of a windscreen wiper device for a vehicle, more particularly for a motor vehicle, in a basic position (FIG. 9), i.e. in an unstressed state, and in a position placed against a windscreen 4 (FIG. 10) according to the embodiments described here. The wiper blade 2 comprises an elongated upper part 10 and an elongated lower part 12 which are configured at least partially flexibly. Several connecting elements 18 are furthermore provided for connecting the upper part 10 and the lower part 12, wherein the connecting elements 18 are spaced apart from one another along a longitudinal extension 8 of the wiper blade 2. The connecting elements 18 are configured in order to enable a movement of the upper part 10 and the lower part 12 relative to one another with a component of movement along a longitudinal extension 8 of the wiper blade 2. The connecting elements 18 are furthermore arranged relative to the lower part 12 so that in an unstressed state of the wiper blade 2 an angle $\alpha_n$ of the respective longitudinal axes 24 of the connecting elements 18 relative to the lower part 12 is changed at least partially along a longitudinal extension 8 of the wiper blade 2, more particularly is changed continuously or monotonously or strictly monotonously.

In the wiper blade illustrated in FIG. 9, in the unstressed state the angles $\alpha_n$ of the respective longitudinal axes of the connecting elements 18 relative to the lower part 12 which change along the longitudinal extension 8 of the wiper blade 2, are marked by $\alpha_1, \alpha_2, \alpha_3, \ldots \alpha_{n-1}, \alpha_n$. In a stressed state of the wiper blade, i.e. in a position placed against the windscreen, as shown by way of example in FIG. 10, the angles $\alpha_n$ of the respective longitudinal axes 24 of the connecting elements 18 relative to the lower part 12 change in comparison with the unstressed state. In order to explain this, the angles $\alpha_n$ of the respective longitudinal axes of the connecting elements 18 relative to the lower part 12 which change along the longitudinal extension 8 of the wiper blade 2, in the wiper blade illustrated in FIG. 2, which is located in a position placed against the windscreen, are marked $\alpha'_1, \alpha'_2, \alpha'_3, \ldots \alpha'_{n-1}, \alpha'_n$.

According to embodiments of the windscreen wiper device which can be combined with other embodiments, the wiper blade 2 has at least one first region in which the angle $\alpha_n$ of the longitudinal axes 24 of the connecting elements 18 relative to the lower part 12 decreases along a longitudinal extension 8 of the wiper blade 2 to one end of the wiper blade, more particularly decreases monotonously, more particularly strictly monotonously. Furthermore, the wiper blade 2 may have at least one second region, in which the angle $\alpha_n$ of the longitudinal axes 24 of the connecting elements relative to the lower part 12 increases along a longitudinal extension 8 of the wiper blade 2 to one end of the wiper blade, more particularly increases monotonously, more particularly strictly monotonously. According to embodiments, as shown by way of example in FIGS. 9 and 10, the second region of the wiper blade in which the angle $\alpha_n$ of the longitudinal axes 24 of the connecting elements 18 relative to the lower part 12 increases along the longitudinal extension 8 of the wiper blade 2 towards one end of the wiper blade, is arranged at an inner position of the wiper blade which is located close to a fastening device 30 of the wiper blade. A windscreen wiper device can thereby be provided which enables a particularly good adaption to the curvature of a windscreen. A substantially more uniform contact pressure of the windscreen wiper device on the windscreen as well as a homogeneous force distribution of the windscreen wiper device can furthermore be produced so that a high wiping quality is achieved.

According to embodiments of the wiper blade which can be combined with other embodiments, the connecting elements 18 are thus fastened, particularly in an unstressed state of the wiper blade 2, on the lower part 12 so that the longitudinal axes 24 of the connecting elements 18 run at angles $\alpha_n$ to the lower part 12 which lie between a lower angular boundary value $\alpha_{nu}$ and an upper boundary value $\alpha_{no}$. According to embodiments, the lower angular boundary value is $\alpha_{nu}=10°$, more particularly $\alpha_{nu}=15°$, more particularly $\alpha_{nu}=20°$, and the upper angular boundary value is $\alpha_{no}=80°$, more particularly $\alpha_{no}=90°$, more particularly $\alpha_{no}=100°$. This guarantees more advantageously a particularly good transfer of a force acting on the lower part to the upper part.

According to embodiments of the windscreen wiper device which can be combined with other embodiments, the connecting elements 18 are configured so that the distance between the upper part 10 and the lower part 12 changes at least partially along a longitudinal extension 8 of the wiper blade 2, more particularly reduces continuously in a first region and increases continuously in a second region. The distance between the upper part 10 and the lower part 12 along the longitudinal extension 8 of the wiper blade 2 can also comprise a region in which the distance between the upper part 10 and the lower part 12 is substantially constant along the longitudinal extension 8 of the wiper blade 2. The distance between the upper part 10 and the lower part 12 is greater at the fastening part than at the opposite end.

According to embodiments of the wiper blade which can be combined with other embodiments, the inner distance value (facing the fastening part) amounts to at least 15 mm, more particularly at least 25 mm, more particularly at least 35 mm. According to embodiments which can be combined with other embodiments, the outer distance value amounts to at least 10 mm, more particularly at least 12.5 mm, more particularly at least 15 mm. According to embodiments which can be combined with other embodiments, the mean distance value amounts to at least 7.5 mm, more particularly at least 9 mm, more particularly at least 12.5 mm.

As shown by way of example in FIGS. 9 to 10, the connecting elements 18 according to embodiments which can be combined with other embodiments, are connected for articulation with the lower part 12 and/or the upper part 10. More particularly the connecting elements 18 are connected to the lower part 12 and/or the upper part 10 by means of a first film hinge 20. The first film hinge 20 can be formed in one piece with the connecting element 18 and the upper part 10 and/or the lower part 12. The one-piece formation of the film hinges enables a simple, commercially viable manufacture.

According to embodiments of the wiper blade which can be combined with other embodiments described here, the wiper blade comprises a first region with a first curvature $\omega<0$ and a second region with a second curvature $\omega>0$. The wiper blade can furthermore according to embodiments have a third region with a third curvature $\omega<0$ wherein the second region of the wiper blade with the second curvature $\omega>0$ is arranged between the first region with the first curvature $\omega<0$ and the third region with the third curvature $\omega<0$, as shown by way of example in FIG. 9. A windscreen wiper device can thus be provided with which a substantially uniform contact pressure can be produced on the windscreen 4. Furthermore a windscreen wiper device can be provided which has an improved adaption to the windscreen 4 and a high wiping quality.

According to further embodiments, in addition to a quick-fix fastening closure which can be used for fin ray wipers, whereby the entire windscreen wiper device is removed from a drive axis or a fastening element on the drive axis on the vehicle, a mechanism can be provided in order to raise and lower the wiper blade 2 of a windscreen wiper device off and on the windscreen 4. This further simplifies the use, for example for a manual cleaning of the windscreen 2.

Figure 11:
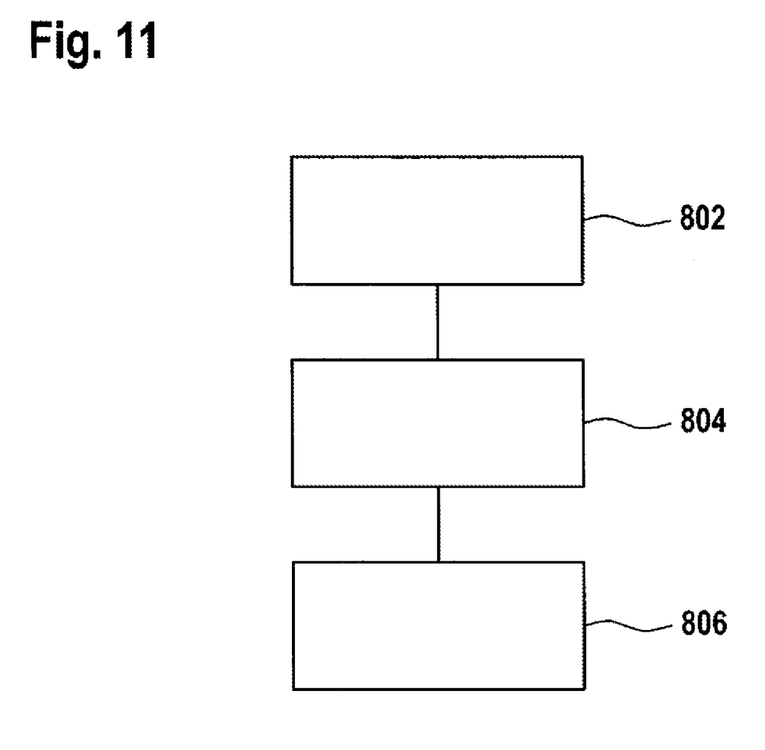
FIG. 11 shows a diagram for illustrating a method for restricting a torque which acts on a wiper arm of a windscreen wiper device according to embodiments of the present invention.

In FIG. 11 a method is described for restricting a torque which acts on a wiper arm of a windscreen wiper device. A fastening element which is fixable on a drive shaft of a vehicle is provided (see 802). Furthermore a wiper blade is provided with a fastening part which can be releasably connected to the fastening element (see 804). The method furthermore comprises fitting together the fastening part of the wiper arm with the fastening element (see 806). This fitting together is carried out by means of a coupling device wherein by this assembly a connection between the fastening element and the fastening part of the wiper arm is produced which is secured against rotation up to a defined torque of the wiper blade. More particularly the fastening element, the wiper blade with the fastening part and the coupling device can be the embodiments of the components described above. The windscreen wiper device can more particularly be a windscreen wiper device which functions on the fin ray principle, wherein a fastening part on the wiper blade side is provided through a cavity with an opening as the guide element. More typically the coupling element is pressed against the guide element by a force-producing element, more particularly a spring, at torques below the defined torque value.

What is claimed is:

1. A windscreen wiper device for a vehicle, comprising a fastening element (50) fixed on a drive shaft (130), and a wiper blade (2) with
   an elongated upper part (10), which is configured at least partially flexibly,
   an elongated lower part (12), which is configured at least partially flexibly,
   a plurality of connecting elements (18) for connecting the upper part (10) and the lower part (12), wherein the connecting elements (18) are spaced apart from one another along a longitudinal extension (8) of the wiper blade (2), and wherein the connecting elements (18) are configured in order to enable a movement of the upper part (10) and the lower part relative to one another with a component of movement along a longitudinal extension (8) of the wiper blade (2),
   a fastening part (30) on a wiper blade side, and
   a coupling device, wherein the fastening part (30) on the wiper blade side and the fastening element (50) are connectable to one another via the coupling device for conjoint rotation until a defined torque value is exceeded, wherein the fastening part (30) and the fastening element (50) are completely released from one another when the defined torque value has been exceeded, wherein the coupling device includes a coupling element (21) and a guide element (210) configured to bear against the coupling element (21) when the defined torque value has not been exceeded, wherein the coupling element (21) is movably mounted on the fastening element (50) and is configured to extend through an opening of the guide element (210) when the defined torque value has not been exceeded, wherein the guide element (210) and the coupling element (21) are arranged such that when the guide element (210) is torqued past the defined torque value relative to the coupling element (21) about an axis that is perpendicular to the longitudinal extension (8) and also perpendicular to a drive axis of the drive shaft (130), the coupling element (21) moves with respect to the fastening element (50) and slips out of the opening of the guide element (210).

2. The windscreen wiper device as claimed in claim 1, wherein the coupling device in the event of torque values up to the defined torque value produces a force-fitting and/or form-fitting connection between the fastening element (50) and the fastening part (30).

3. The windscreen wiper device as claimed in claim 1, wherein the coupling element (21) includes a curved portion with a radius at one end of the coupling element (21), wherein the curved portion is configured to bear against the guide element (210).

4. The windscreen wiper device as claimed in claim 3, wherein the coupling element (21) and the guide element (210) are configured so that the coupling element (21) with radius slips through the guide element (210) when the defined torque value is reached and can then release the rotationally secured connection between the fastening element (50) and fastening part (30).

5. The windscreen wiper device as claimed in claim 1, wherein the defined torque value lies in a range from approximately 4 Nm to approximately 50 Nm.

6. The windscreen wiper device as claimed in claim 1, wherein the fastening part (30) on the wiper blade side is formed in one piece.

7. The windscreen wiper device as claimed in claim 1, wherein the fastening part (30) on the wiper blade side is formed free of metal and/or without movable elements.

8. The windscreen wiper device as claimed in claim 1, wherein the plurality of connecting elements (18) are connected at several upper connecting positions to the upper part (10) and at several lower corresponding connecting positions to the lower part (12), and wherein in the event of movement of the upper part (10) and the lower part (12) relative to one another the distance between an upper connecting position and a corresponding lower connecting position is substantially constant.

9. The windscreen wiper device as claimed in claim 3, wherein the guide element (210) is attached to the fastening part (30) of the wiper arm.

10. The windscreen wiper device as claimed in claim 1, wherein the coupling device furthermore comprises a spring attached to the coupling element (21).

11. The windscreen wiper device as claimed in claim 1, wherein the defined torque value lies in a range from approximately 10 Nm to approximately 25 Nm.

12. The windscreen wiper device as claimed in claim 1, wherein when the defined torque value is exceeded the functional connection between the drive shaft (130) and the fastening part (30) of the wiper arm is released.

13. The windscreen wiper device as claimed in claim 1, wherein the plurality of connecting elements (18) are connected at several upper connecting positions to the upper part (10) and at several lower corresponding connecting positions to the lower part (12), and wherein in the event of movement of the upper part (10) and the lower part (12) relative to one another the distance between an upper connecting position and a corresponding lower connecting position is constant with a deviation of ±1 mm.

14. The windscreen wiper device as claimed in claim 1, wherein the coupling element (21) is an elongate spring-biased sliding coupling element (21) having a distal end with a curved profile, and wherein the guide element includes a wall having the opening, wherein the opening is a through opening through which the coupling element (21) slides, wherein when the defined torque value has been exceeded the coupling element is configured to slip out of the through opening.

15. The windscreen wiper device as claimed in claim 14, wherein the guide element includes a support bearing (230) that defines part of the opening.

16. A method for restricting a torque which acts on a wiper arm of a windscreen wiper device, comprising:
providing a fastening element (50) which can be fixed on a drive shaft (130) of a vehicle;
providing a wiper blade with fastening part (30) which can be detachably connected to the fastening element (50);
joining the fastening part of the wiper arm with the fastening element by means of a coupling device, the coupling device having a first coupling element (21) and a guide element (210) with an opening, wherein through the joining a connection is produced between the fastening element and the fastening part of the wiper arm which is conjoint in rotation up to a defined torque value of the wiper blade, and wherein the fastening part (30) and the fastening element (50) completely release from one another upon exceeding the defined torque, wherein the guide element (210) bears at least partially against the coupling element (21) when the defined torque value has not been exceeded, wherein the coupling element (21) is movably mounted on the fastening element (50) and extends through the opening of the guide element (210) when the defined torque value has not been exceeded, wherein the guide element (210) and the coupling element (21) are arranged such that when the guide element (210) is torqued past the defined torque value relative to the coupling element (21) in a direction about an axis that is perpendicular to the longitudinal extension (8) and also perpendicular to a drive axis of the drive shaft (130), the coupling element (21) moves with respect to the fastening element (50) and slips out of the opening of the guide element (210).

17. The method as claimed in claim 16, furthermore comprising pressing the coupling element (21) against the guide element (210) via a force-producing element (211) in the event of torques below the defined torque.

* * * * *